United States Patent [19]
Tenzor et al.

[11] Patent Number: 6,165,103
[45] Date of Patent: *Dec. 26, 2000

[54] SHIFTING MECHANISM

[75] Inventors: John H. Tenzor, Punta Gorda, Fla.; Rex A. Corless, Sterling Heights, Mich.

[73] Assignee: Visteon Global Technologies, Inc., Dearborn, Mich.

[*] Notice: This patent is subject to a terminal disclaimer.

[21] Appl. No.: 09/307,035

[22] Filed: May 7, 1999

[51] Int. Cl.[7] ................................................ F16H 63/44
[52] U.S. Cl. ........................ 477/127; 475/201; 475/204; 475/206; 192/69.91; 192/108
[58] Field of Search ........................... 475/201, 204–207; 74/335; 477/124, 35; 192/69.91, 53.4, 108

[56] References Cited

U.S. PATENT DOCUMENTS

| | | |
|---|---|---|
| 2,326,754 | 8/1943 | Buckendale . |
| 2,438,620 | 3/1948 | Russell . |
| 2,443,590 | 6/1948 | Alden . |
| 2,488,756 | 11/1949 | Baker . |
| 2,516,850 | 8/1950 | Brownyer . |
| 2,783,661 | 3/1957 | Dryer . |
| 3,031,900 | 5/1962 | Stump . |
| 3,413,873 | 12/1968 | Bixby . |
| 3,503,280 | 3/1970 | Bopp . |
| 3,910,131 | 10/1975 | Richards ............................. 192/108 X |
| 4,286,480 | 9/1981 | Dickie . |
| 4,347,762 | 9/1982 | Holdeman . |
| 4,418,585 | 12/1983 | Pierce . |
| 4,440,042 | 4/1984 | Holdeman . |
| 4,509,389 | 4/1985 | Vahratian et al. . |
| 4,604,908 | 8/1986 | Dolan . |
| 4,607,541 | 8/1986 | Miura et al. . |
| 4,690,015 | 9/1987 | Nagano et al. . |
| 4,711,136 | 12/1987 | Yoshinaka et al. . |
| 4,713,980 | 12/1987 | Ida et al. . |
| 4,719,814 | 1/1988 | Ida et al. . |
| 4,723,459 | 2/1988 | Yoshinaka et al. . |
| 4,787,491 | 11/1988 | Kato .................................... 192/108 X |
| 4,836,049 | 6/1989 | Moan . |
| 4,838,121 | 6/1989 | Takeshita et al. . |
| 4,841,803 | 6/1989 | Hamano et al. . |
| 4,841,804 | 6/1989 | Miura et al. . |
| 4,846,016 | 7/1989 | Takeuchi et al. . |
| 4,944,197 | 7/1990 | Stine et al. ................................ 74/477 |
| 4,967,616 | 11/1990 | Minami et al. . |
| 4,978,328 | 12/1990 | Pierce . |
| 5,099,711 | 3/1992 | Langbo et al. ........................ 74/335 X |
| 5,197,355 | 3/1993 | Sherman et al. . |
| 5,346,442 | 9/1994 | Eastman . |
| 5,511,448 | 4/1996 | Kameda et al. . |
| 5,538,482 | 7/1996 | Tanzer et al. . |
| 5,554,080 | 9/1996 | Dangel . |
| 5,802,915 | 9/1998 | Organek et al. .......................... 74/331 |
| 5,885,182 | 3/1999 | Forsyth ............................... 475/207 X |
| 5,888,165 | 3/1999 | Besler et al. . |

Primary Examiner—Sherry Estremsky
Attorney, Agent, or Firm—Larry I. Shelton

[57] ABSTRACT

In a shifting mechanism housed in a case a first relatively rotating member rotates about an axis. A second relatively rotating member is selectively coupled and decoupled with the first member. The coupling has a first spline tooth with a first axial length, and a second spline tooth with a second axial length longer than the first spline tooth. The second spline tooth has an end having a frusto-conical shape. One of the first and second members has a plurality of third spline teeth for engagement with the spline teeth of the coupling. The third spline teeth have a complimentary frusto-conical shape. A selector is moveable for actuating the coupling to mutually connect and disconnect the members. A resilient connection is provided between the coupling and selector.

20 Claims, 14 Drawing Sheets

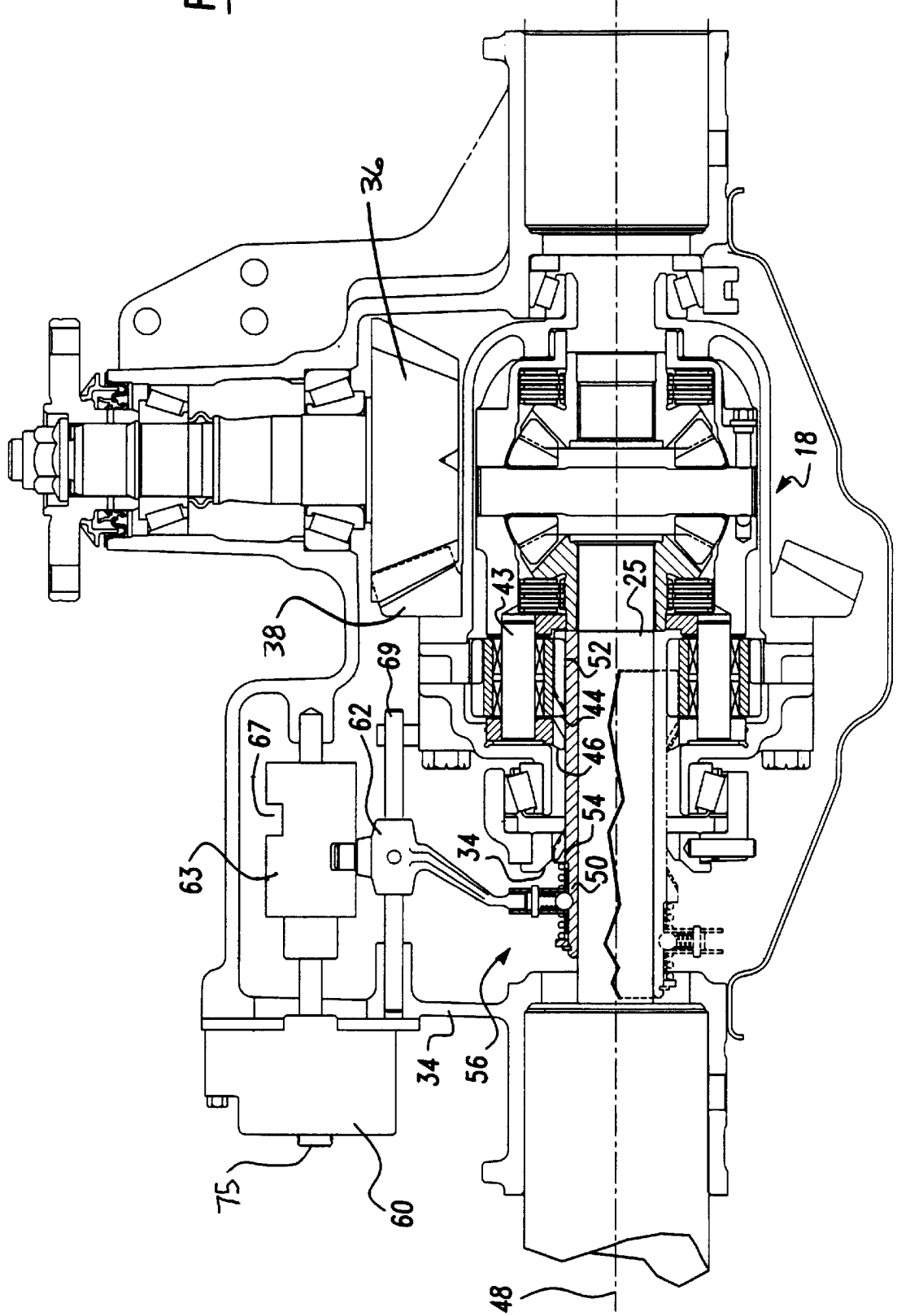

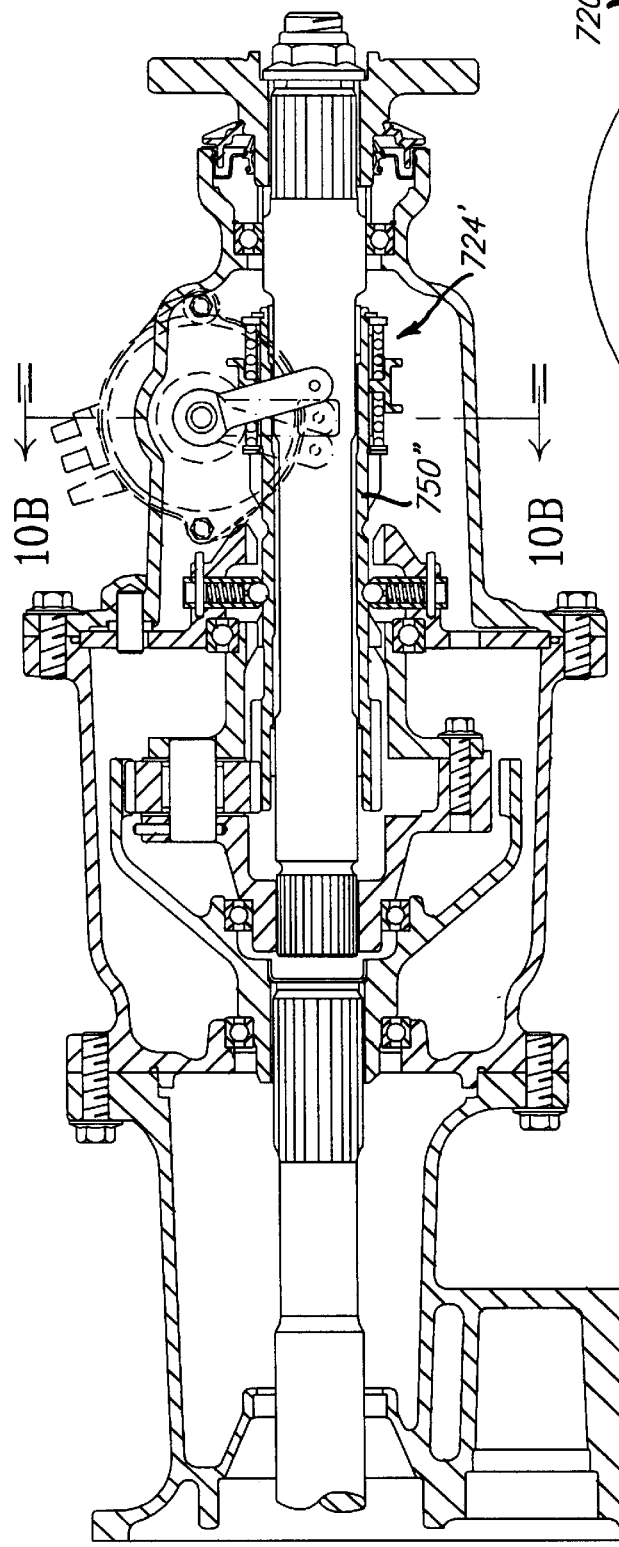
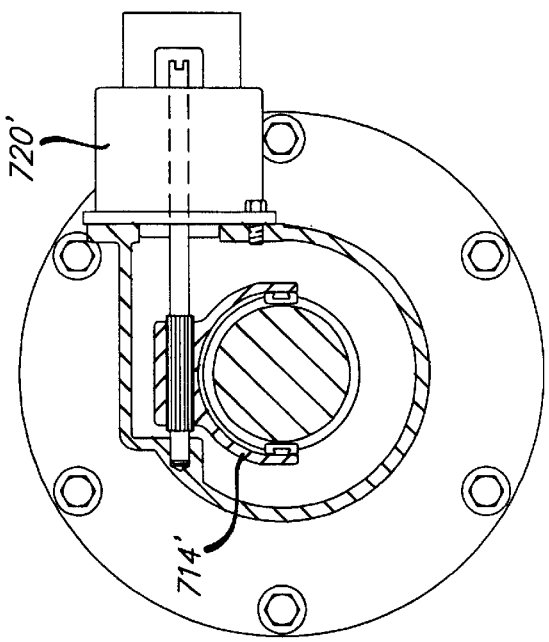
Fig-10A
Fig-10B

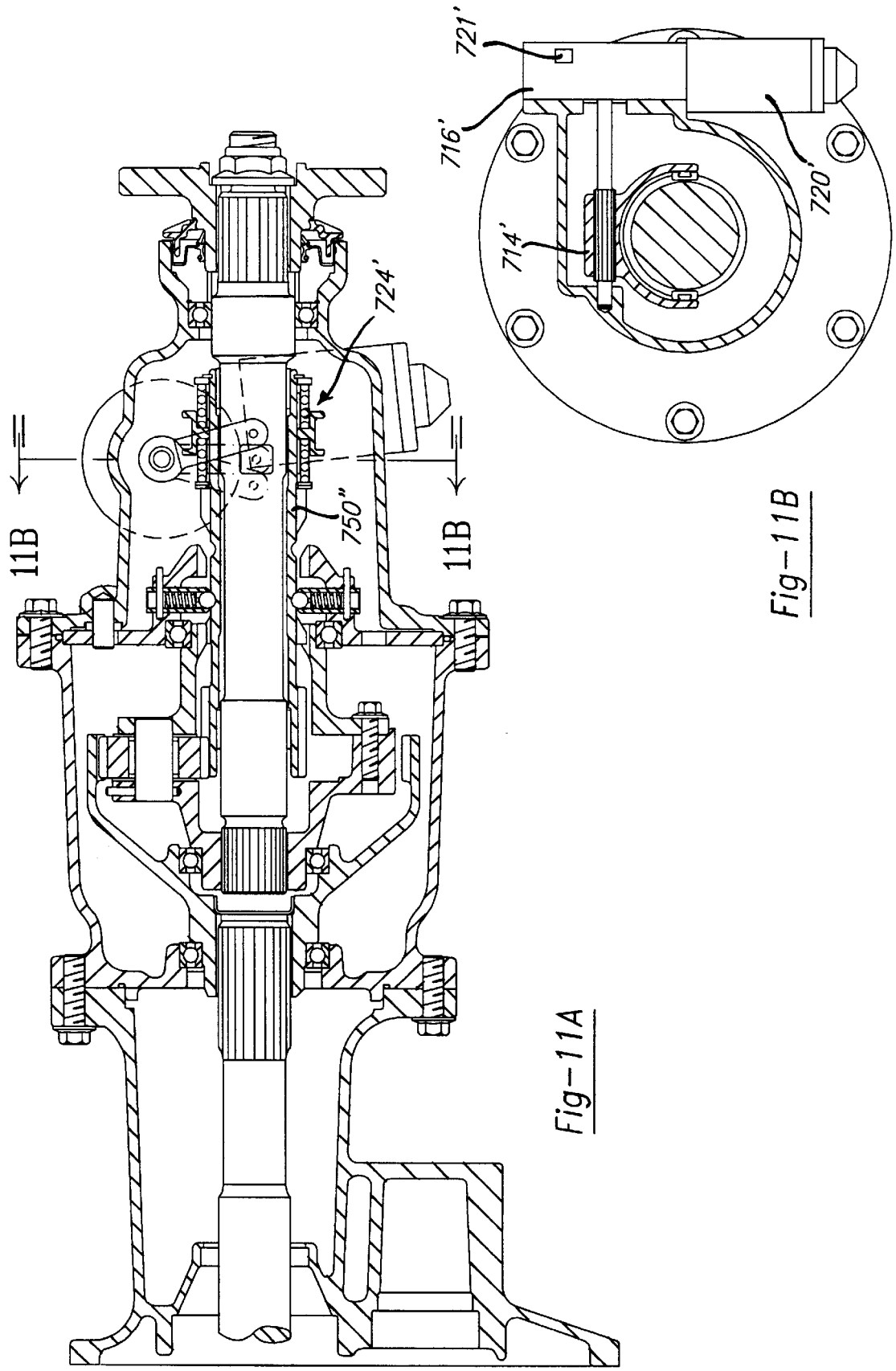

SHIFTING MECHANISM

BACKGROUND OF THE INVENTION

1. Field of the Invention

This invention relates to the field of power transmission in a driveline for an automotive vehicle. More particularly, it pertains to a secondary transmission for an automotive transmission.

2. Description of the Prior Art

It is desirable to have a large range of gear ratios is an automatic transmission to accommodate the demand for various applications, such as towing. It is also desirable to increase the number of selectable gear ratios and the range therefor, to provide gear ratios to maximize fuel economy and drivability. It is desirable to provide a shifting mechanism to provide these ratios.

To drivably connect relatively rotating shafts, a mechanical synchronizer is commonly provided to synchronize the rotational speed of the shafts, an example of which is provided in U.S. Pat. No. 4,375,172. The device of the '172 patent is a relatively effective mechanism, but is produced at high cost and not able to engage over a wide speed variation.

The mechanism employed in the '172 patent includes a blocked resilient axial interconnection between a jaw clutch assembly and main shaft 23 to improve the range of engagement. As described with reference to FIGS. 8 and 9 of the '172 patent, a device according to the '172 patent provides a large amount of backlash 208 to ensure adequate initial penetration, or engagement 212 of the teeth. This excessive backlash is not desirable as it provides additional slop in the system.

It would be desirable to provide a non-blocked engagement device for engaging relatively rotating shafts and to provide such a device on a transmission.

SUMMARY OF THE INVENTION

The avoid the difficulties and high cost associated with developing and manufacturing transmissions having a large number of forward speed ratios, and in order to improve the cost and performance of a device for shifting, an improved shift mechanism is provided.

In a shifting mechanism housed in a case a first relatively rotating member rotates about an axis. A second relatively rotating member is selectively coupled and decoupled with the first member. The coupling has a first spline tooth with a first axial length, and a second spline tooth with a second axial length longer than the first spline tooth. The second spline tooth has an end having a frusto-conical shape. One of the first and second members has a plurality of third spline teeth for engagement with the spline teeth of the coupling. The third spline teeth have a complimentary frusto-conical shape. A selector is moveable for actuating the coupling to mutually connect and disconnect the members. A resilient connection is provided between the coupling and selector.

Such a shift device allows for shifting on-the-go despite the input and output shafts lacking fully synchronized rotational speeds. Such a shift device is useful in many devices, including two-speed axles, subtransmissions (such as secondary transmissions or two-speed gearboxes), 4WD shift mechanisms and power take-off units. The shift mechanism may be coordinated with a computer to synchronize the input and output speeds to improve the shift "feel".

Such a mechanism is further improved using an electronic controller to adjust the input and output rotational speeds closer to synchronous, utilizing engine, transmission and ABS control features in conjunction with adaptive shift motor controls. A shift device according to the present invention thereafter completes the shift at substantially synchronous speeds preferably using a "snap-action" shift device.

BRIEF DESCRIPTION OF THE DRAWINGS

FIG. 2 is representation of a cross section taken at plane 2—2 of FIG. 1.

FIGS. 10A and 10B illustrate a partial sectional side view and end view, respectively, of a secondary transmission using a further alternative shift device according to the present invention.

FIGS. 11A and 11B illustrate a partial sectional side view and end view, respectively, of a secondary transmission using a further alternative shift device according to the present invention.

DESCRIPTION OF THE PREFERRED EMBODIMENTS

Figure 1:
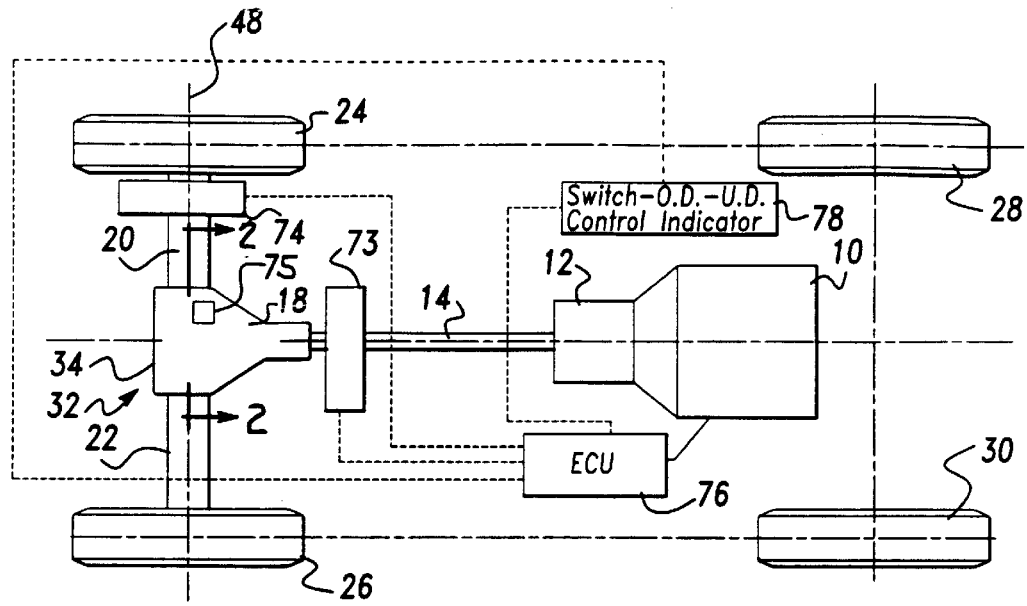
FIG. 1 is a schematic plan view of a powertrain for a motor vehicle that includes a multiple-speed rear axle assembly utilizing an illustrative shift device according to the present invention.

As described in my U.S. Pat. No. 5,888,165, ('165 patent), and my copending application Ser. No. 09/307,034, filed concurrently with this application having the same inventorship and title, which are incorporated herein by reference in their entirety, as shown in FIG. 1, the powertrain for a rear wheel drive motor vehicle includes an engine 10; transmission 12; rear drive shaft 14; rear axle differential 18, left-hand and right-hand rear axle shafts 20, 22; and rear drive wheels 24, 26. The right-hand and left-hand front drive wheels 28, 30 are not driven in a rear wheel drive application, as is known to one skilled in the art. The engine 10 is drivably connected to the multiple-speed transmission 12 which is drivably connected to the drive shaft 14, which is connected to the input shaft of a multiple-speed axle drive mechanism 32 located within a case or housing 34.

As described with reference to FIG. 2 in the 165 patent, application, the drive shaft 14 is connected to a beveled input pinion 36 drivably connected to a ring gear 38 of a two-speed axle 32 located within housing 34. The ring gear 38 is rotatably supported by the housing 34 at bearings 40, 42. The ring gear 38 is in continual meshing engagement with a plurality of planetary pinion gears 44 supported for rotation by pinion carrier 46. The carrier 46 is in continual driving engagement with an interwheel differential, an example of which is disclosed in U.S. Pat. No. 5,316,106. The differential 18 drives the rear drive wheels 24, 26 about an axis of rotation 48 via axle shafts 24, 26 in a manner known to one skilled in the art.

Figure 3:
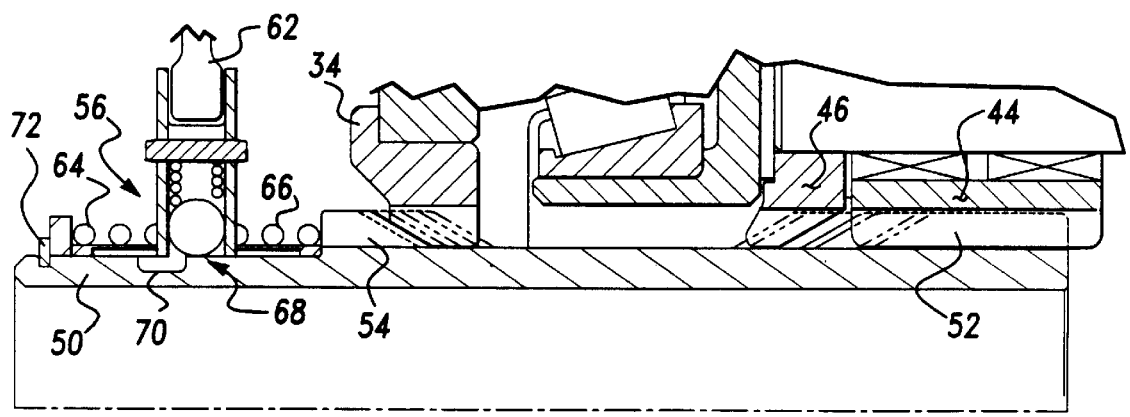
FIG. 3 is an enlarged view of a portion of the mechanism shown in FIG. 2.

As best shown in FIGS. 2 and 3, a coupling 50 is provided in the axle 32 to mutually drivably connect and disconnect the pinions 44 and the carrier 46. The coupling 50 comprises an annular sleeve member coaxial with the axis 48. The coupling 50 carries a sun gear 52 in meshing engagement with pinion gears 44. The coupling 50 also carries a second gear 54 axially displaced from the sun gear 52. The coupling 50 is shown in a first position at the right hand side of axis 48, wherein the coupling 50 provides an underdrive condition by locking pinion gears 44 against rotation with respect to housing 34 when coupling 50 engages housing 34 at the second gear 54. Furthermore, although the present application is described above with reference to an underdrive ratio across the planetary gearset, in a preferred embodiment, the input gear ratio (for example the beveled pinion ratio) is adjusted so the so-called "underdrive ratio" comprises the equivalent of a direct drive ratio and the so-called "direct drive" ratio comprises an overdrive ratio.

In FIG. 2, the coupling 50 is shown at a second position at the bottom of the axis 48. At this second position, the coupling 50 is axially moved to a second position wherein gear 54 is moved out of engagement with the housing 34. In this second position, the sun gear 52 remains in meshing engagement with pinion gears 44 while sun gear 52 also engages the carrier 46 to mutually rotate the carrier 46 and pinions gears 44 to produce a direct drive ratio. The coupling 50 is disconnected from the housing 34 prior to the sun gear 52 being drivably connected to the carrier 46, otherwise the entire planetary gearset would lock up against rotation.

As further shown in FIG. 2, sun gear 52 is carried by the coupling 50 and is drivably engaged with pinion gears 44 in the underdrive and direct drive positions. A motor 60 is supported by the housing 34. The motor 60 moves a shift fork 62 axially to move coupling 50 to a desired position to obtain the proper axle ratio. A preferred embodiment of the motor 60 comprises a rotary electric motor, coaxially rotatably connected to a shift cam 63 through an approximately 58:1 reduction worm gear. Because of the large gearing reduction through the worm gear, only a small electric motor is required. The shift cam 63 includes a spiral groove 67 engaged with the shift fork 62. Thus, as the motor 60 rotates the shift cam 63, the spiral groove 67 urges the shift fork 62 axially. The shift fork 62 is supported on a rod 69 which is supported by the housing 34 for axial movement. Alternatively, one skilled in the art recognizes the motor 60 may comprise a linear electric motor or a vacuum motor or any equivalent motor for imparting such linear travel in the shift fork. Alternatively, a mechanical connection may impart the axial movement of the shift fork 62, such as through a Bowden cable connection as is known to one skilled in the art.

Figure 4:
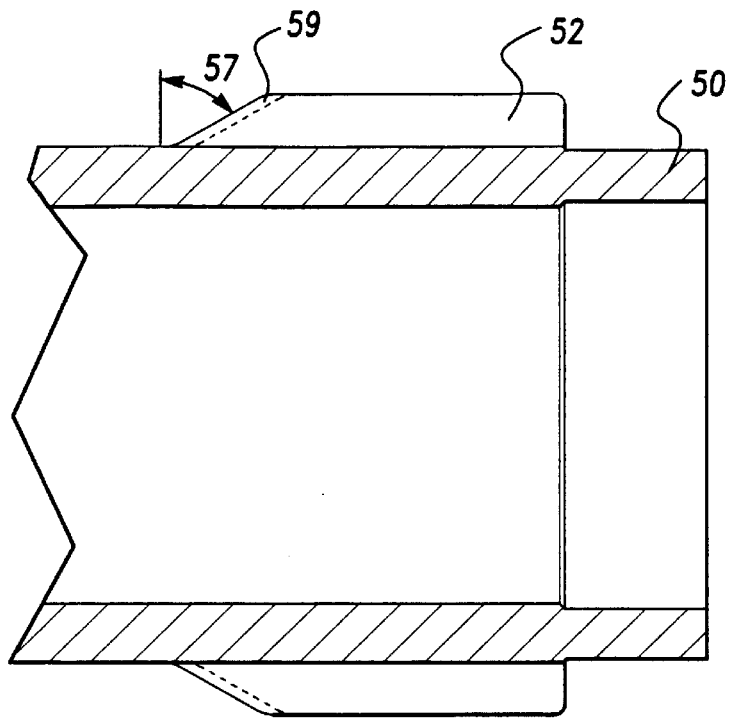
FIG. 4 is a partial sectional view of the coupling shown in FIG. 2.

The shift cam 63 preferably includes a detent (not shown), preferably comprising a detent position (not shown) in the spiral groove 67. This detent is positioned to correspond with the sleeve 50 in a "synchronizing" position as described below. The spiral of the groove 67 extends helically around the cam 63, so as the cam 63 is rotated by the motor 60, the shift fork 62 is moved axially approximately 4.5 mm past a centered position, which corresponds to "neutral". The centered "neutral" position is where the second gear 54 is not rotatably engaged with the housing 54 and the sun 52 is not engaged with the carrier 46. Preferably as illustrated in FIG. 4, the second gear 54 is nearly immediately adjacent the housing 34 at the neutral position, while the sun 52 is approximately 2.0 mm from engagement with the carrier 46.

The coupling 50 preferably moves axially 9 mm in either direction from the centered neutral position, but begins synchronizing with the housing 34 or carrier 46 when the shift fork 62 is moved approximately 4.5 mm axially on either side of centered neutral, the 4.5 mm position being the "synchronizing" position (alternatively called "neutral plus"). At this "synchronizing" position, within the groove 67, the cam preferably has the detent, comprising a portion of the groove 67 extending circumferentially perpendicular to the axis of rotation of the cam 63 (versus helically), so the shift fork 62 is momentarily not urged further axially by the fork while the shift cam 63 continues to rotate.

As shown in FIG. 3, during synchronization, the ball lock mechanism 68 disengages the groove 70 of the sleeve, so the sleeve 50 does not move axially the entire 4.5 mm. While the shift fork 62 is within the detent, the spline teeth of the sleeve 50 are synchronized as described above while the axial spring provides an axial force on the sleeve 50 to urge the sleeve into engagement. As the second gear 54 synchronizes with the housing 34, the spring 66 urges the sleeve rightwardly and the ball lock 68 will again engage the groove 70. Once the cam 63 is rotated past the detent, the groove 67 extends further helically, so that the sleeve 50 is urged axially to fully engage the spline teeth as described above for another approximately 4.5 mm axially. Thus, in this preferred embodiment, the spline teeth are engaged approximately 7–9 mm; however one skilled in the art recognizes these distances are application specific and will vary based on the torque being transmitted, as well as the physical characteristics of the splines and gears.

One skilled in the art recognizes that the detent could alternatively comprise rotationally stopping the motor 60 at the point where the shift fork 62 is moved axially within groove 67 approximately 4.5 mm, so the synchronization can occur when synchronous speeds are obtained and initial engagement of the spline teeth occur as described above. Speed (RPM) sensors (not shown) preferably detect synchronization, i.e. when the spline teeth are initially engaged, and the motor 60 is started again to rotate until the spline teeth fully engaged.

A resilient connection 56, described in further detail below, is provided between the shift fork 62 and the coupling 50 to ensure proper force is applied during engagement of the various members 52, 44, 46, 54, 34 to enable proper synchronization and smooth engagement thereof. This arrangement further provides a "snap-action" engagement of the teeth when the rotational speeds are synchronized. This device further provides shock absorption when the members engage. The resilient connection 56 enables the motor 60 to move the shift fork 62 to an absolute axial position, while the coupling 50 may not necessarily be fully engaged and therefore not properly axially aligned with the shift fork 62.

One skilled in the art recognizes that an equivalent resilient connection 56 may be provided between the motor 60 and shift fork 62, or any location between the input to move the shift collar and the shaft supporting the member to be engaged (i.e. the gear itself could be axially spring loaded). An example of another preferred resilient connection between the motor and shift fork is shown in U.S. Pat. No. 4,498,350 at 20, 20', which is incorporated herein by reference for the relevant teachings provided therein.

As shown in FIG. 3, a preferred resilient connection 56 comprises a pair of pre-loaded axial compression springs 64, 66 provided between the shift fork 62 and the coupling 50. The springs 64, 66 are axially opposed, each applying an axial force on the coupling 50 when the shift fork 62 is moved in the direction of the particular spring 64, 66. Thus as shown in FIG. 3, the shift fork 62 is moved rightwardly and spring 66 is compressed, thereby imparting an additional axial force on coupling 50 through gear 54 until the gears are engaged and the shift fork 62 and coupling 50 are aligned. The springs 64, 66 are selected to provide a proper force on the coupling 50 to ensure proper synchronization and full engagement. The springs bias the coupling in the desired direction, and when synchronous speeds are realized due to the teeth, then the coupling engages rapidly with a "snap action engagement", where the spring urges the coupling into the final position and the ball lock is reengaged. Further, the springs absorb energy during the initial engagement of the teeth—so as the longer teeth initially engage, the coupling will move axially against the spring force until rotational speeds are synchronous, allowing the coupling to move axially in the desired direction. The springs thus apply an axial force on the coupling 50. Once the spline teeth described below are aligned on the various members 52, 44, 46, 54, 34 to be engaged, the spring force urges the coupling to snap into engagement with the member. Likewise, when the shift fork 62 is moved leftwardly, the second spring 64 imparts a leftward force upon coupling 50 through a stop 72 provided on the coupling 50 to provide proper synchronization and engagement force as described above.

Preferably, the resilient connection 56 further includes a ball lock mechanism 68 provided on the shift fork 62. The ball lock mechanism 68 is radially displaceable from engagement in a groove 70 provided on coupling 50. Thus, when the motor 60 rotates and moves the shift fork 62 axially, which then urges the coupling 50 rightwardly to engage the gear 54 with the housing 34, if the spline teeth on gear 54 and housing 34 are not synchronized, the spline teeth axially oppose each other at the conical portion of the spline teeth described below with reference to FIG. 4. Because the motor 60 forces the shift fork 62 rightwardly beyond the centered "neutral" position before the rotational speeds are synchronized, the unsynchronized opposing splint teeth resist axial movement of the coupling 50. This resistance causes the ball lock 68 to come out of engagement from the groove 70, but the axial spring 66 continues to impart an axial force upon the coupling 50 to engage the second gear 54 with housing 34. Once the rotational speeds are synchronized, the spline teeth on the gear 54 engages the housing 34 and the axial spring 66 causes the coupling 50 to move rightwardly into engagement with the housing 34 and the ball lock mechanism 68 is aligned with the groove 70 and is engaged therein. Likewise, when the sun gear 52 engages the carrier 46, the shift fork 62 is moved leftwardly.

The ball lock mechanism 68 disengages the groove 70 leftwardly and the second spring 64 urges the coupling 50 leftwardly until the coupling 50 is synchronized with the carrier 46 and engaged therewith, allowing the coupling 50 to align the groove 70 with the ball lock mechanism 68 of the shift fork 62.

As shown in FIG. 3, the coupling 50 is illustrated in a position where the motor 60 has moved the shift fork 62 rightwardly and disengaged the ball lock mechanism 68. Because the second gear 54 is not synchronized with the housing 34, the second gear 54 occupies the leftward position abutting the housing 34 as shown in FIG. 3. As the second gear 54 synchronizes rotation with the housing 34, the second gear 54 moves rightwardly as illustrated in phantom. During this rightward movement, the sun gear 52 also moves rightwardly, away from the carrier 46. As shown the FIG. 3, during synchronization of the coupling 50 with the housing 34, the sun gear 52 occupies the center position shown in the right hand portion of FIG. 3. In this position, sun gear 52 is spaced axially approximately 2 mm from the carrier 46, and is therefore not engaged with carrier 46 and the drive is in a "neutral" state. As the coupling 50 moves rightwardly into the underdrive position as described above, or leftwardly, into the direct drive position as described above, the sun occupies the respective position as shown in phantom.

Figure 5:
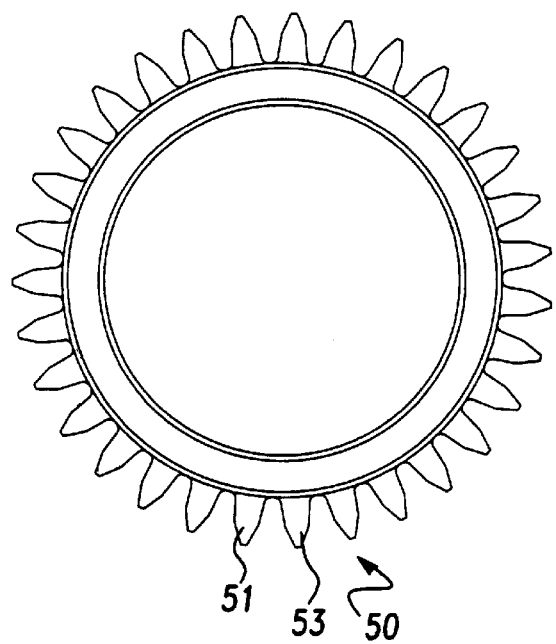
FIG. 5 is an end view of the coupling shown in FIG. 4.

The engagement of the members 52, 44, 46, 54, 34 is provided through a plurality of circumferentially spaced spline teeth. As shown in FIG. 4, the sun gear 52 is preferably formed integrally on the sleeve 50. As shown in end view FIG. 5, the sun gear 52 comprises a plurality of circumferentially spaced spline teeth 51, 53. The sun gear 52 teeth 51, 53 have flat contact surfaces for engagement with complimentary teeth provided on the planetary pinion gears 44 and the carrier 46. As is known to one skilled in the art, the flat contact surfaces of the teeth 51, 53 may include small spiral shaped grooves (not shown) for carrying lubrication.

Figure 6:
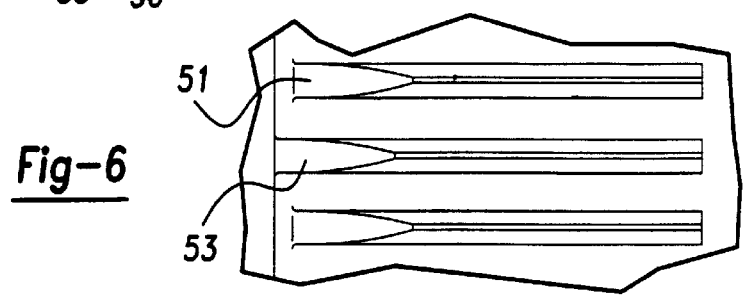
FIG. 6 is a partial side view of the spline teeth of the coupling shown in FIG. 4.

In a preferred embodiment, the teeth are synchronized mechanically. As shown in FIG. 6, every other tooth 51 is preferably recessed axially from adjacent teeth 53, so lockup is more easily obtained at synchronizing speeds. If the rotational speeds are synchronized electronically as explained below, the recessed teeth are less necessary. As is shown in FIG. 4, the teeth of sun gear 52 include a cone angle 57 optimized for synchronization with a complimentary cone angle provided on the teeth of the carrier 46. The teeth of the sun gear 52 preferably further include a tapered surface 59 at the leading edge of the teeth 51, 53 to facilitate engagement of the sun gear 52 and carrier 46. The spline tooth spacing is optimized to minimize backlash. The second pair of teeth 54 on the coupling 50 are similarly formed to synchronize the rotational speed of the coupling 50 when engaging the teeth on the housing 34

In another preferred embodiment, the rotational speeds of the members 52, 44, 46, 54, 34 are synchronized electronically using the engine controller and/or the antilock braking system of the motor vehicle. As shown in FIG. 1, sensors 73, 74 are provided to measure the rotational speed of the input and output of the differential 18. The input speed is preferably measured by obtaining the output speed of the transmission 12 using sensors 73, 74 as is known in the art. As shown in FIG. 2, based on the reduction of the input pinion 36, the rotational speed of the ring gear 38 is known. The rotational speed of the planetary pinion gears 44, sun gear 52, and carrier 46 is calculated based on the position of the coupling which mutually connects and disconnects several of the members 52, 44, 46, 54, 34 as described above.

The output speed of the differential 18 is preferably inferred by measuring the rotational speed of the wheel 24 using an antilock braking system (ABS), which is known to one skilled in the art and not described here in detail. In a preferred embodiment, the ABS system includes an ABS sensor illustrated as sensor 74, such an ABS sensor being known to one skilled in the art. The speed of the wheel 24 may be used to estimate the rotational speed of the carrier 46 when differential action is not occurring. Thus, to electronically control the synchronization of the members 52, 44, 46, 54, 34, the input speed of the input gear 36 or output speed of the differential 18 may be controlled. As will be appreciated by the description provided herein, the sensors 73, 74 may be located in various positions to provide the signal indicating the input and output rotational speeds.

Preferably, the sensors 73, 74 send a signal to a computer 76, such as an engine control unit (ECU). The computer 76 then determines whether it is proper to have the axle in an underdrive or direct drive position based on the rotational speeds of the driveline. Once this determination is made, the computer 76 provides a signal to control the rotational speeds of the input or output shaft to synchronize the rotation of the members 52, 44, 46, 54, 34 by controlling the engine speed, antilock brakes or transmission. The speeds are thus synchronized by using the ECU to increase or decrease the rotational speed of the engine 10 or transmission 12 in a manner known to one skilled in the art, or by decreasing the output rotational speed of the differential 18 by using the antilock brake system (ABS) to apply a brake at one or more of the rear wheels 48, 26 as is also known to one skilled in the art. As the rotational speeds are thus synchronized, the motor 60 is commanded by the computer 76 to move the shift fork 62 to the desired position to create the proper ratio.

In a preferred embodiment, a further sensor 75 is provided to sense the position of the shift fork 62 and to determine if the shift fork is in the proper position and preferably within the proper "synchronization timing window" to engage smoothly and to obtain the desired ratio. This "timing window" is provided in the period at which the rotational speeds are substantially synchronous. In FIG. 2, the sensor 75 is illustrated schematically as an encoder provided on the motor 60, but could be incorporated in the case to sense the fork or coupling, or any other part of the mechanism. The rotational speed sensors 73, 74 then measure the rotational speeds and the computer 76 calculates whether the proper ratio is actually engaged. Such a sensor 75 may be of any known form, such as an encoder, a linear position sensor, a Hall Effect sensor, a limit switch, or any other known positional sensing devices.

The positional signal provided by the sensor 75 is preferably further used to enable the controller to adjust the axial shifting speed provided by the motor 60 and thereby position the mechanism in the proper axial position when the rotational speeds are synchronized—i.e. the shaft speeds are synchronized within a short "time window" through which the device preferably axially moves the shift fork to soften the shift harshness; the motor 60 is controlled to shift through this "time window" at which the rotational speeds are substantially synchronous.

Selection of the underdrive ratio may be performed automatically by the computer 76 commanding a shift when appropriate as described above. Otherwise, such a shift may be commanded manually by the operator moving a lever or a switch 78 to a desired position, such as commanding an underdrive position. Preferably the switch 78 includes a digital display to indicate the presently engaged ratio or mode (such as underdrive or performance). For example, a light may be illuminated when underdrive is engaged. Alternatively, an indicator may be provided on the instrument panel cluster to indicate the ratio.

An axle according to the present invention may thus be used to multiply the number of gear ratios in an existing transmission. In such an arrangement, a shift of the axle may be commanded simultaneously during a shift of a gear in the transmission to multiply the transmission ratio across the axle to obtain a wider range transmission. For example, third gear may be reduced using the axle to produce a final drive ratio between first and second gears in the transmission. In such an example, movement of a manual shift lever to what was previously second gear position would cause third gear to be engaged and the axle simultaneously shifted to underdrive. Upon movement of the shift lever to what was previously third gear, the second gear would be engaged and the axle simultaneously shifted to the direct drive position.

Although described here with reference to a differential on a rear wheel drive vehicle, the present concepts may readily be applied by one skilled in the art to another drive configuration. For example, the present invention may be added before or after the transmission in either a front wheel drive or rear wheel drive vehicle to provide additional gear reduction or increase the number of gear ratios provided thereby. An example of such an application in a front wheel drive application is described in U.S. Pat. No. 5,474,503, assigned to the assignee of the present invention, which is incorporated herein by reference. In such an instance, the input to the planetary gearset comprises a direct rotational input instead of a beveled pinion gear as illustrated in FIG. 1. In this case, the secondary transmission (or two-speed gearbox) provides an additional reduction to increase the number of gear ratios available. A clutch according to the present invention may be provided in a device according to the '503 patent to engage the ring with the one way clutch, or such a device may be used in place of the transfer clutch. As would be appreciated by one skilled in the art, the present invention is capable of doubling the number of gear ratios produced by such a transmission. For example, a four speed transmission may be used in an application to provide up to eight forward speed ratios using a secondary transmission or an axle according to the present invention.

Figure 7A:
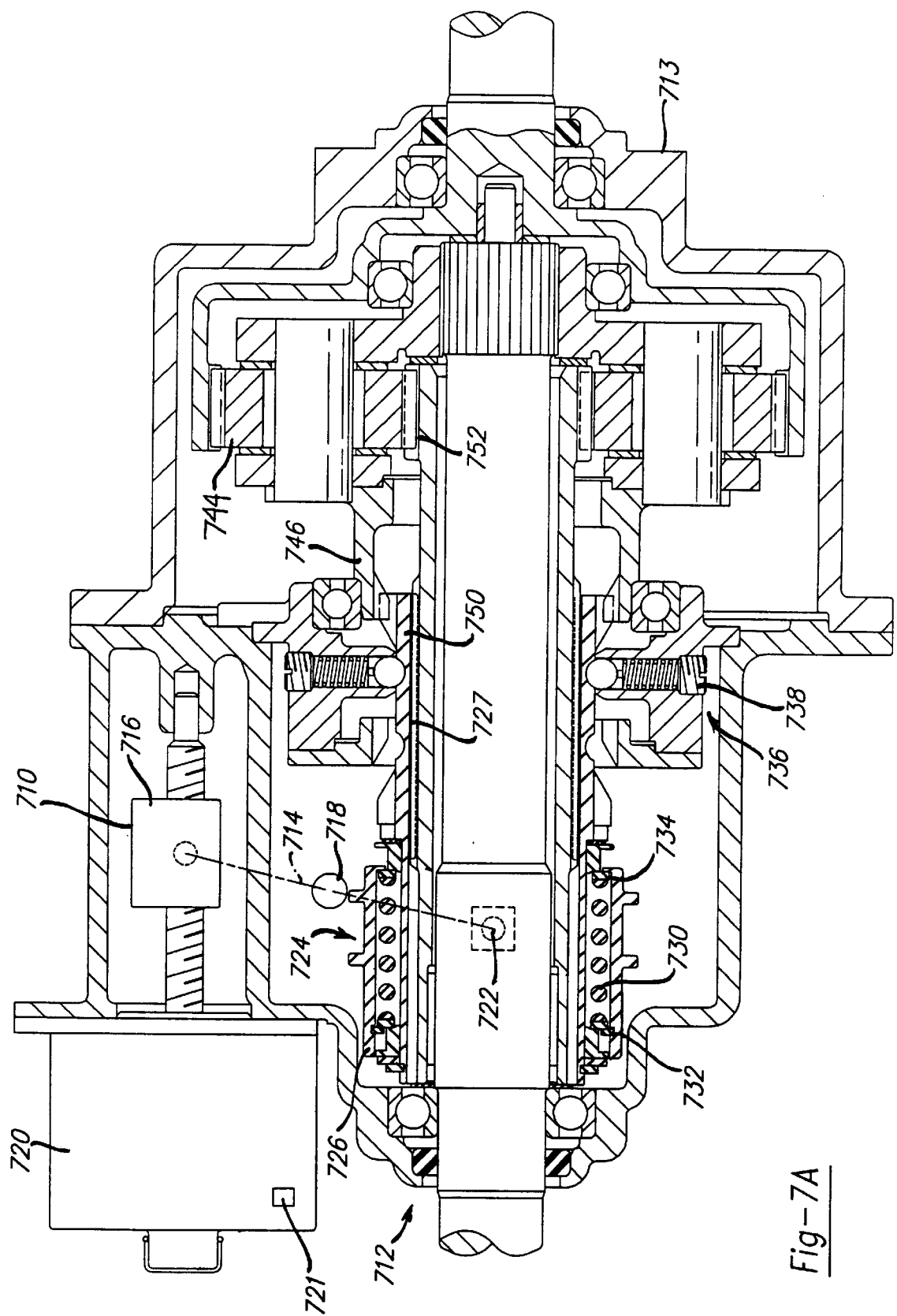
FIG. 7A illustrates a secondary transmission using a shift device according to the present invention in a first position rotatably locking the sun and carrier in a direct drive ratio.
Figure 7D:
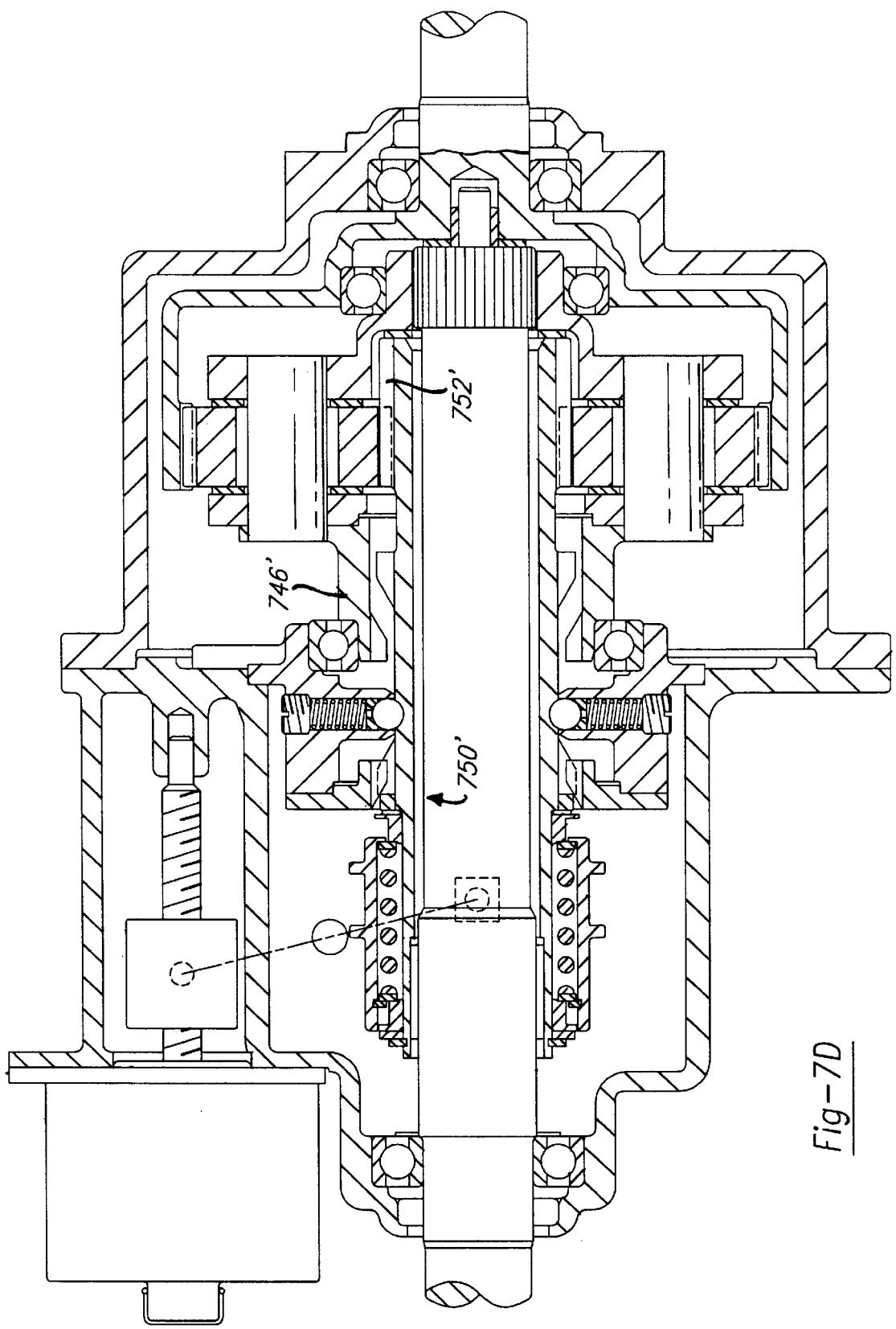
FIG. 7D illustrates the secondary transmission of FIG. 7C in a second position to engage a gear reduction.
Figure 7C:
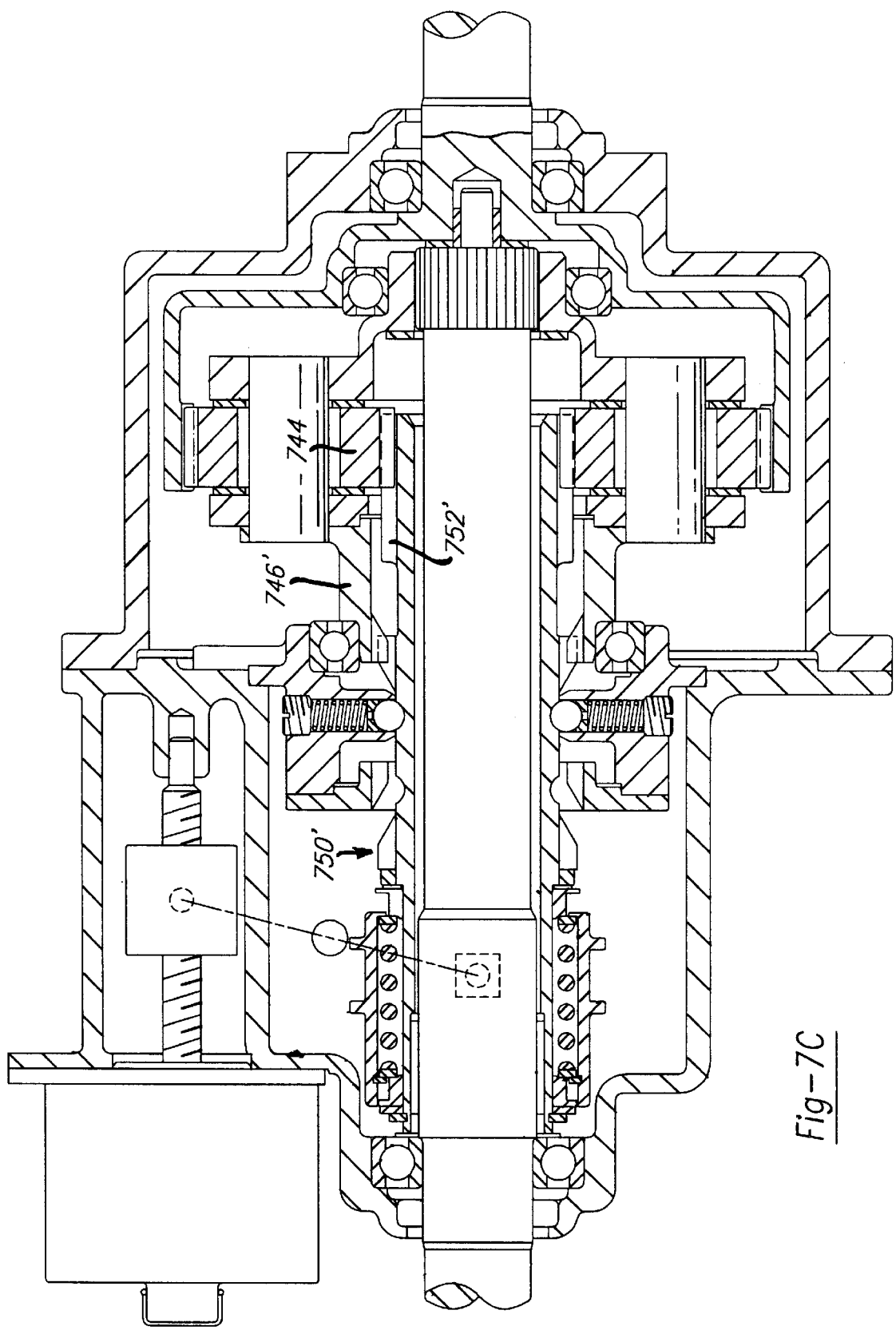
FIG. 7C illustrates a secondary transmission using an alternative shift device according to the present invention in a first position rotatably locking the sun and carrier in a direct drive ratio.
Figure 7B:
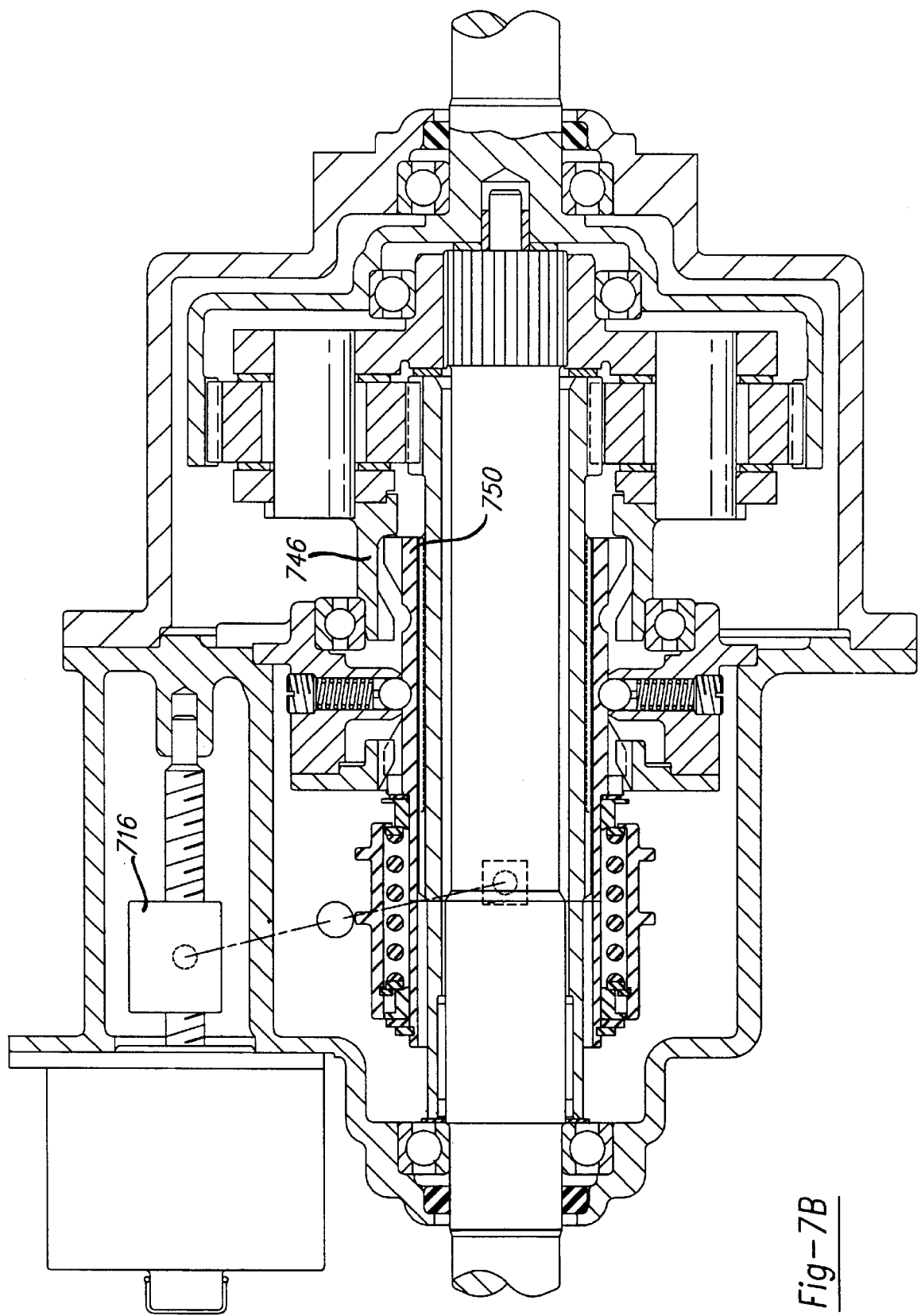
FIG. 7B illustrates the secondary transmission of FIG. 7A in a second position to engage a gear reduction.

A rear wheel drive secondary transmission (alternatively called a subtransmission or two-speed gearbox) is illustrated in FIGS. 7A–D. FIGS. 7A and 7B illustrate a first embodiment, while 7C–7D illustrate a second embodiment. The reference numbers remain the same in each 7A–7D except where the design differs.

In a secondary transmission according to the present invention, a shift mechanism 710 is provided to shift a secondary transmission 712 for a rear wheel drive vehicle. The secondary transmission 712 is located behind the primary transmission 12 illustrated in FIG. 1. Preferably, the transmission 12 includes a flange at the rear end thereof and the secondary transmission 712 may be selectively mounted at 713 thereto on an optional basis to provide additional gear ranges, or an optional overdrive system. The shift device 710 is similar in many manners to the device previously described in FIGS. 2–6, but the shift fork of that device is replaced by a lever attached to a ball screw drive 716. As motor 720 rotates, ball screw drive 716 is forced axially. This translates the end of lever 714 attached thereto.

The lever 714 rotates about a pivot 718 to translate the opposite end of the lever 714 a proportional distance (of course the lever 714 travels in an arc, the linear vector is presently of interest). The lever 714 includes a bifurcated end 722 (for the sake of clarity, one end is shown in phantom in this partial sectional view) which engages an annular groove 724 provided in a sleeve 726 engaged with a coupling 750. Preferably the motor 720 includes a known encoder 721, illustrated schematically, for determining the rotational position thereof. The controller preferably interprets a signal from the encoder 721, and after interpreting the position of the motor 720, the controller commands the motor 720 to shift the coupling within the "time window" during which the input and output speeds are substantially synchronous.

The coupling 750 has a splined connection 727 to the sun gear and one skilled in the art appreciates this device operates in a manner similar to that described above with reference to the axle above and therefore the operation will not be described in great detail here. As shown in FIG. 73, the coupling 750 is slid from the position shown in FIG. 7A where the sun 752 and carrier 746 were locked to a position where the coupling 750 is moved rightwardly as viewed in FIG. 7B to a position where the coupling 750 is drivably disengaged from the carrier 747. Preferably this produces a reduction to develop an underdrive ratio across the planetary gearset. One skilled in the art could develop a variety of reductions and rotational reversals in a known manner and therefore these will not be discussed here in detail.

A compression spring 730 is provided between the sleeve 726 and coupling 750 and functions in a manner similar to the springs 64, 66 described above with reference to FIGS. 2 and 3, by providing a resilient connection at either end 732, 734 between the input force provided by the shift mechanism 710 and the coupling 750. Further, a shift position detent, or ball lock mechanism 736, is provided to retain the coupling 750 in a manner similar to that described above, thereby retaining the desired gear engagement. A screw 738 is provided to install the ball lock mechanism 736 on the coupling 750, and in one embodiment is used to adjust the force of the ball lock mechanism. As shown in FIG. 7A, the ball lock mechanism engages one of a pair of grooves provided in the sleeve 750, each groove corresponding to an "end detent position", such that the ball lock mechanism 736 in this embodiment operates to engage a pair of terminal grooves, versus the central groove 70 shown in FIG. 2. The planetary gear engagement, as illustrated in FIGS. 7A–B, includes a helical engagement between the sun gear 752 (part of the splined 727 sleeve 750) and planets 744. As appreciated by one skilled in the art, this design provides axial thrust bearings adjacent the gears 752, 754 to accommodate the resultant thrust loads.

FIGS. 7C–7D illustrate a variation to the embodiment shown in FIGS. 7A–7B. In this embodiment, the coupling 750' carries the sun gear 752' and the splined connection 727 of FIGS. 7A and 7B is eliminated. A feature of this embodiment is that the gear engagement between the sun 752' and planetary gear 744 comprises a simple spur gear profile, thus enabling translation of the coupling 750 directly and minimizing any axial loading. One skilled in the art appreciates the straight spur gear engagements, such as the sun 752 to planets 744 in FIG. 7C–7D, contrasted to the embodiment of FIGS. 7A–B, provide for minimal axial gear reactions.

Figure 12A:
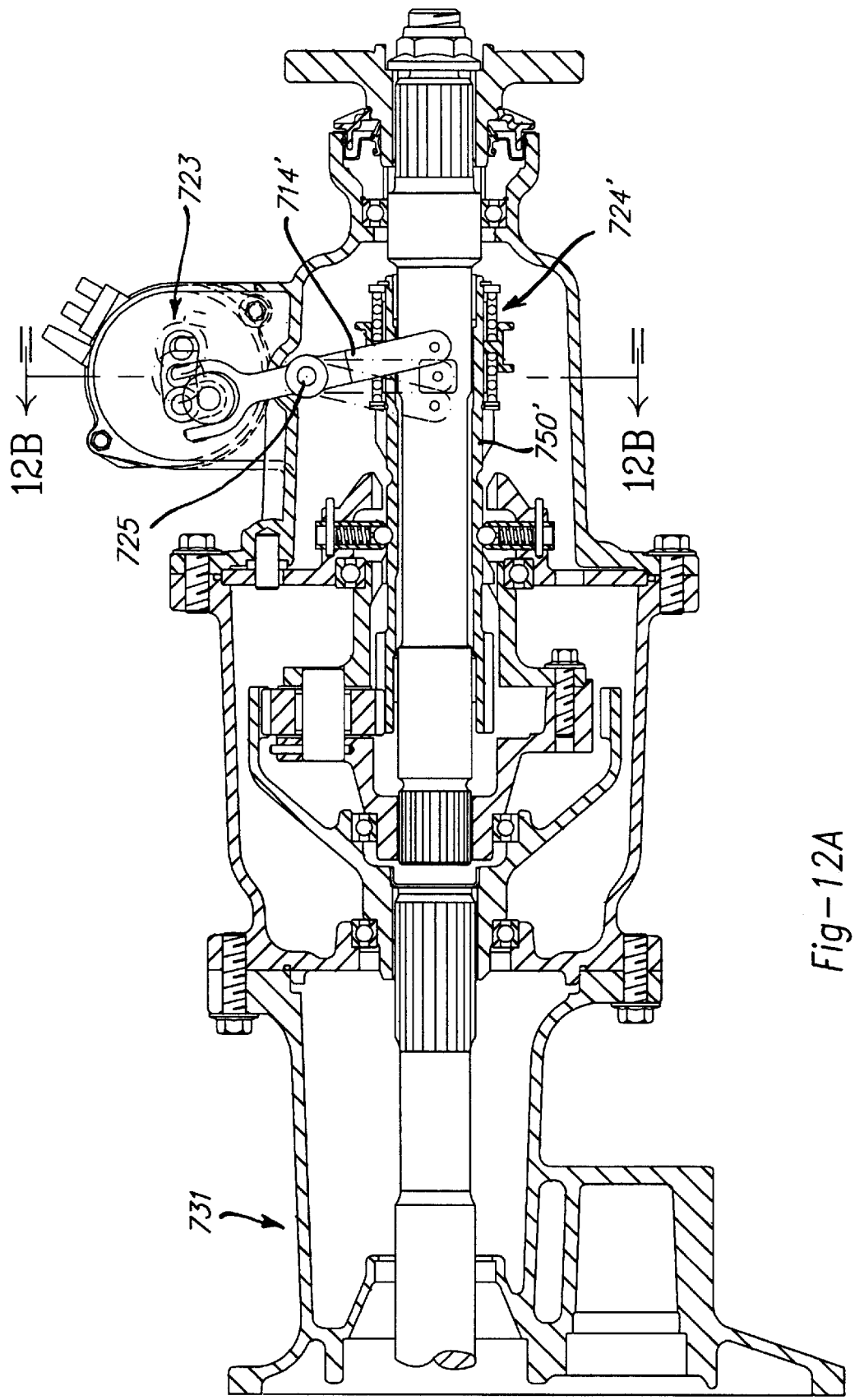
FIGS. 12A and 12B illustrate a partial sectional side view and end view, respectively, of a secondary transmission using a further alternative shift device according to the present invention.
Figure 12B:
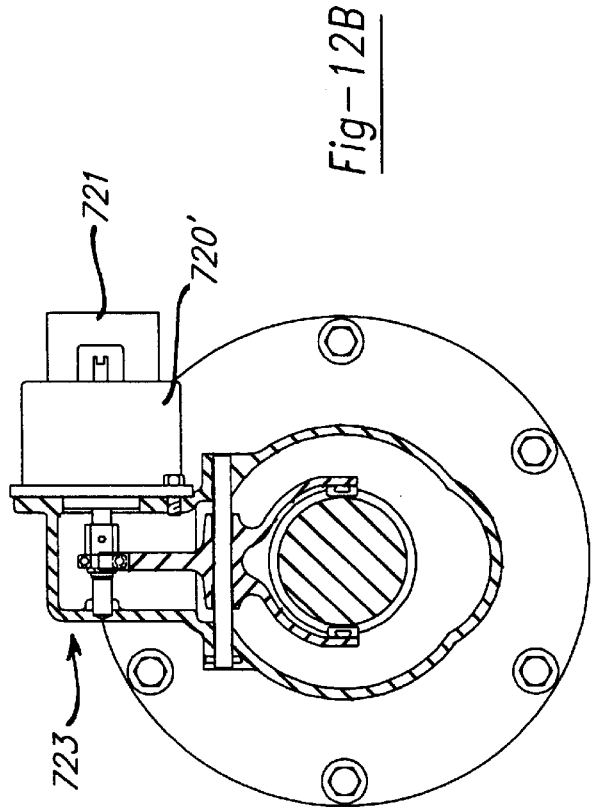
Figure 12C:
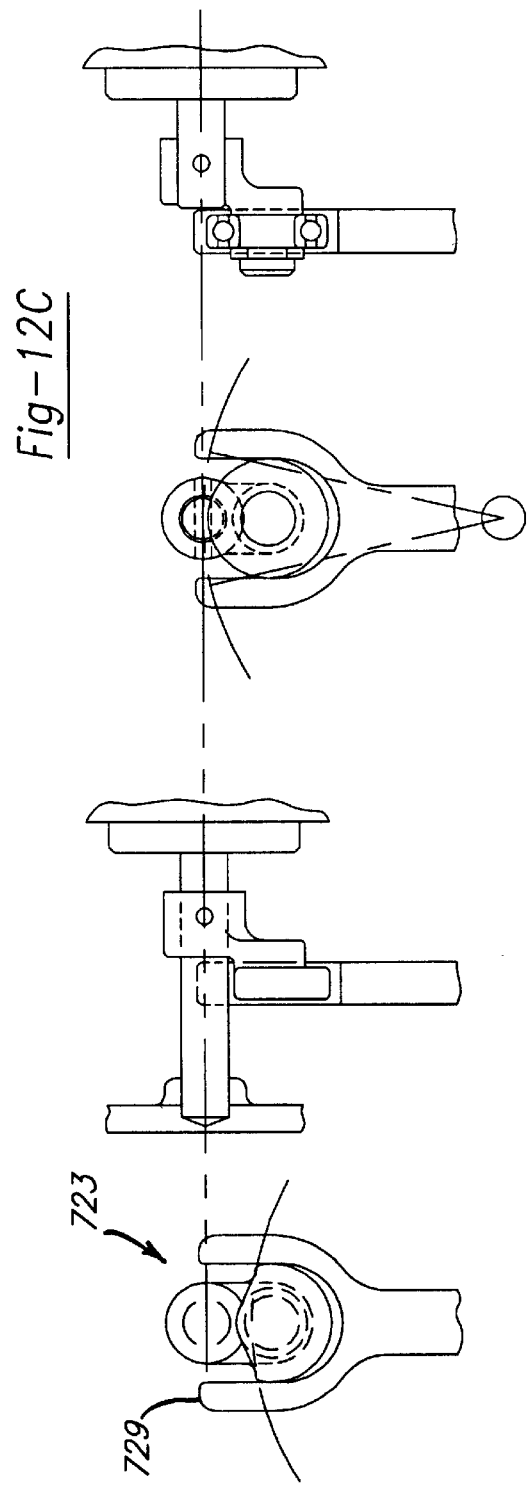
FIG. 12C illustrates an eccentric cam for the device illustrated in FIGS. 12A–B.

Further alternative shifting devices are provided in FIGS. 10–12. These embodiments are similar to the devices described above, in that they utilizes many of the same components but these embodiments have a generally more simple shift device. These devices are illustrated in use as a secondary transmission, but one skilled in the art appreciates the applicability to other devices as described above. In the embodiment of FIGS. 10A and 10B, an electric motor 720'; is connected through a shaft to a link 714'. The link 714' is in the form of a shift fork and engages a slot in the coupling 750'' through a snap-action device 724'. The snap-action device 724' provides a resilient connection between the link 714' and coupling 750'' in a manner similar to the embodiments described above and is therefore not described in greater detail here.

In the embodiment of FIGS. 11A and 11B, an electric motor 720'; is connected to a reduction gearbox 716', which is subsequently connected to a link 714'. The link 714' is in the form of a shift fork and engages a slot in the coupling 750'' through a snap-action device 724'. An encoder illustrated schematically at 721', senses the position of the gearbox 716', or alternatively the motor 720'. The snap-action device 724' provides a resilient connection between the link 714' and coupling 750'' in a manner similar to the embodiments described above and is therefore not described in greater detail here.

In the embodiment of FIGS. 12A, B and C, an electric motor 720'; is connected to an eccentric pivot 723, which is subsequently connected to a link 714'. The link 714' is in the form of a shift fork and engages a slot in the coupling 750'' through a snap-action device 724'. The snap-action device 724' provides a resilient connection between the link 714' and coupling 750'' in a manner similar to the embodiments described above and is therefore not described in greater detail here. The link 714' rotates about a pivot 725 to effect a translation of the coupling 750''. The eccentric device is illustrated in Figure C from right to left in an end view of a mid position, then a side view of the same position. As the motor 720' rotates, the eccentric pivot device 723 rotates in a bifurcated end 729 of the link 714', thereby causing rotation of the link 714' about the pivot 725.

Preferably, at the time the shift fork is in its "detented end positions", the eccentric cam effect of this embodiment generates the additional shift force required to overcome the ball lock mechanism 738 so the ball is forced out of the detent, thereby reducing the shift torque requirement for the electric motor 720. Thus, a smaller motor 720 may be used and/or the gear reduction 716 (ref. FIG. 11B) may be reduced or eliminated.

Furthermore, the present invention may use an adapter to bolt onto an existing transmission case and thereby require no additional modifications to the transmission, particularly when this device is used on an optional basis in production.

Figure 7E:
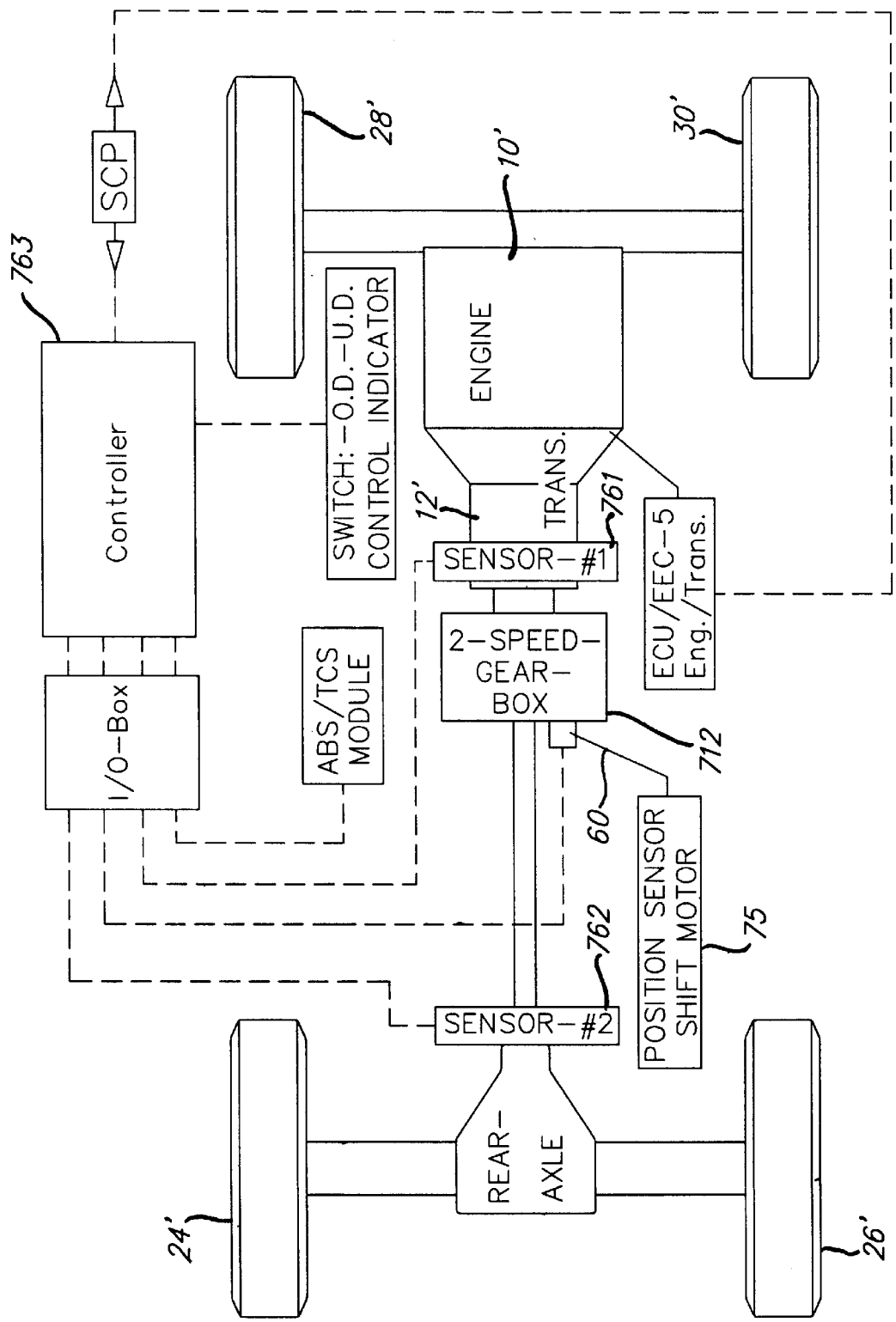
FIG. 7E- is a schematic illustration of a vehicle using a secondary transmission according to FIGS. 7A–7D.

As illustrated schematically in FIG. 7E in a preferred embodiment, the secondary transmission 712 of FIGS. 7 through 7D are utilized in combination with an automatic transmission 12' attached to an engine 10'. In this arrangement, the electronic control logic of the transmission 12' is preferably adapted to change the gear shift sequence and clutch slippage in a known manner to further improve the synchronization of the input and output shaft speeds during a shift of the secondary transmission 712, and thereby improve the shift smoothness of the secondary transmission 712, bringing about the shifts in a coordinated manner. The transmission controls may be used in conjunction with the engine and antilock brake controls as described above.

As described above, the shifting of the device in FIGS. 7–7D are most smoothly accommodated by nearly synchronizing the rotational speeds of the input and output prior to engaging the shift mechanism 710. This is best accomplished by monitoring the input/output speeds using sensors as is known to one skilled in the art, for example using a transmission sensor 761 and driveshaft sensor 762.

Examples of such sensors include ABS sensors, turbine speed sensors, or any other such known sensor used to measure the rotational speed of the vehicle driveline. A controller 763 receives signals from the sensors and adjusts the input/output speeds by controlling the rotational speed of the engine 10' and/or the wheels 24'–30'. Such a controller 763 comprises one or more known controllers, such as an engine controller, antilock brake controller, transmission controller, or a traction control controller (utilizing ABS and/or engine controls), preferably -while simultaneously adjusting the shift motor speed by monitoring the shift motor position sensor 721' to allow adequate time for input/output shaft rotational speed changes in order to substantially synchronize the speeds thereof. Simultaneously, the controller adjusts the shift motor speed to allow adequate time for input/output shaft speed changes before the coupling is urged into position, thereby smoothing the engagement thereof. Of course the device 710 acts to provide the snap-action shift as described above, so the speeds need not be synchronized for engagement. However, by controlling the motor 720, the engagement is timed to enable smooth shifting.

Figure 9:
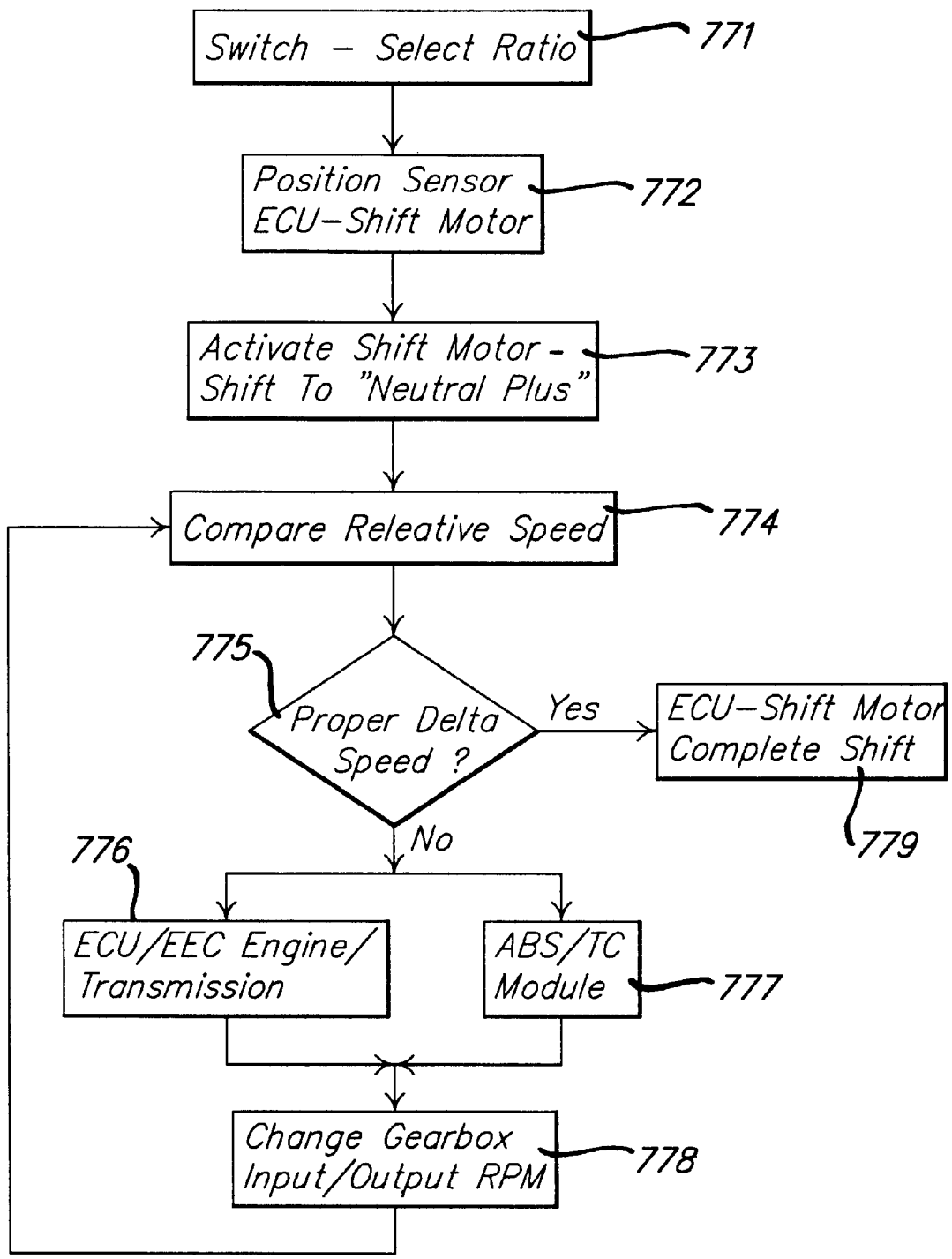
FIG. 9 illustrates a representative flow chart for synchronizing rotational shaft speeds while using a device according to the present invention.

An exemplary logic is provided in the flow chart of FIG. 9. As illustrated in FIG. 9, an input is provided at 771 to indicate a shift is desired, either manually or using a controller as described above. Preferably the shift motor position is known 772 and the motor is commanded to shift at 773 in the direction to actuate a shift. However, the motor is shifted to the "neutral plus" position described above and not completely to the shifted position. At this time, the controller compares the rotational speeds 774 and determines at 775 whether the shaft speeds are adequately synchronized. If so, the shift motor commands the shift to be completed 779. If not, one or more controllers, such as the engine and/or transmission controller 776 or ABS and/or traction controller 777 control one or more rotational speeds 778 as described above to synchronize the rotational speeds, which is compared again at 774–775 and the shift is completed 779 once acceptable.

Figure 8:
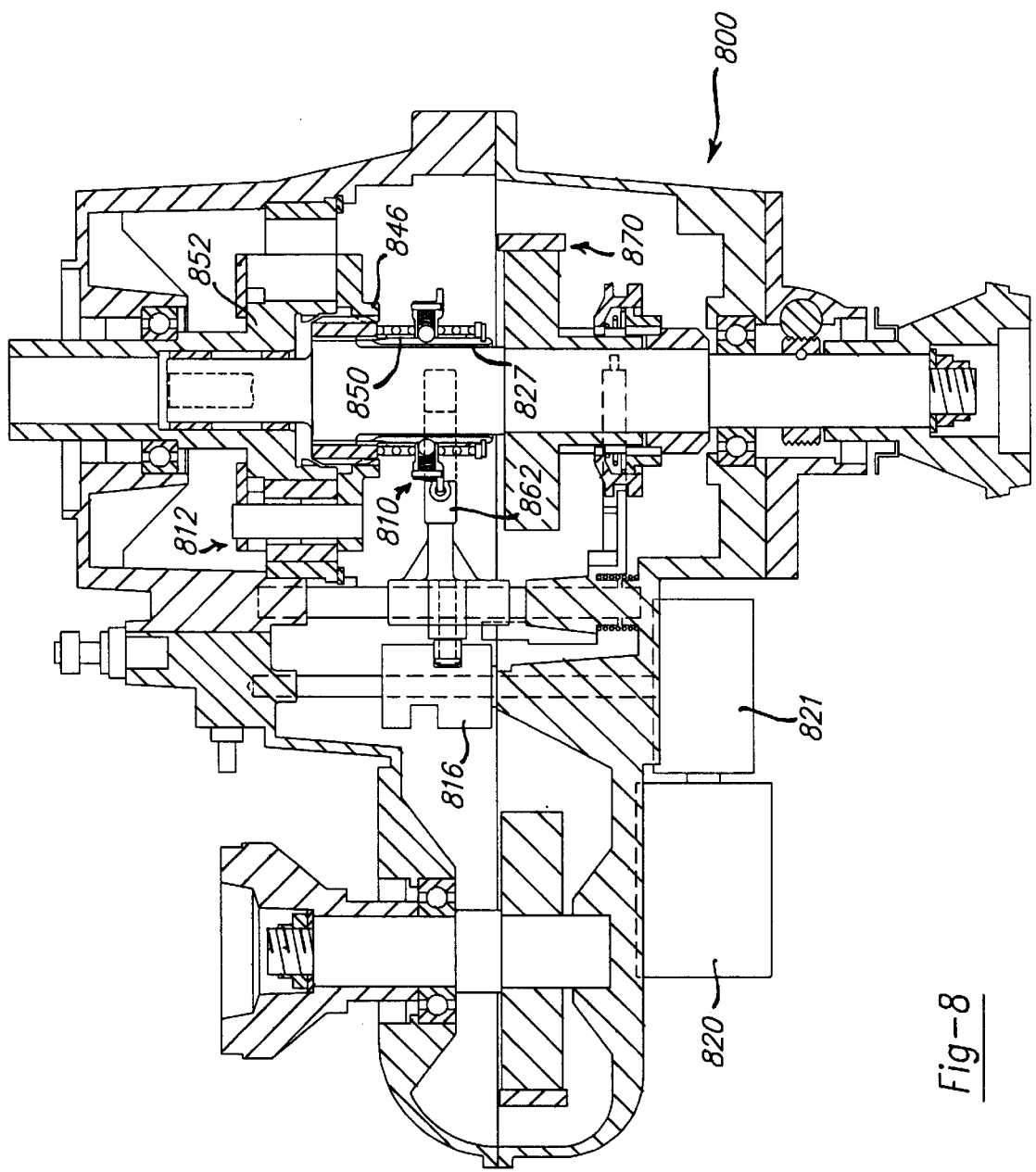
FIG. 8 illustrates a transfer case using a shift mechanism according to the present invention.

As illustrated in FIG. 8, a shift device 810 according to the present invention may be applied in an application including a four wheel drive transfer gearbox. The planetary gearset 812 would provide a gearing reduction in a transfer gearbox to provide a reduction from a four wheel high ratio to a four wheel low ratio in a manner known to one skilled in the art. Such a device is described in U.S. Pat. No. 4,718,303, which is incorporated herein by reference. However, the coupling mechanism, embodied as clutch plates in the '303 patent, are replaced by the shift mechanism 810 to replace the clutch plates as the coupling mechanism.

A device according to the present invention enables a shift to either a transfer to 4WD or a 4WD Low reduction to occur while the vehicle is moving, as the synchronization device and techniques taught herein provide for such reduction in a transfer gearbox in a smooth manner. The function of this device is similar to the other devices described above, and is therefore not described in great detail. An electric motor 820 acts through a reduction gearbox 821 having an internal sensor (not shown) to detect position to move a rotating cam device 816, similar to that described above. The rotating cam device 816 includes a cam follower sleeve provided at the end of the shift fork 862 to actuate a shift fork 862 to translate a spring-loaded coupling 850 as described above. The coupling 850 is splined 827 to the output shaft for axial movement while remaining rotatably engaged thereto.

The coupling 850 engages the planetary carrier 846 for a reduction across the planetary gearset for 4WD Low range, or alternatively, the sun gear 852 for 4WD high or 2WD ranges (not shown in the alternate position). One skilled in the art appreciates that this device can be equally applied to a secondary transmission as described above for a gear reduction in 2WD mode, or for a 2WD system (versus the 4WD system illustrated in FIG. 8). A separate device 870 is provided in FIG. 8 to engage the 4WD feature. This device 870 could be a similar snap-lock device as described above or a conventional 4WD engagement as known to ins skilled in the art.

Although not illustrated, one skilled in the art also appreciates the present invention may be used in a layshaft transmission to engage a journalled gear with a relatively rotating shaft and thereby replace a blocked synchronizer as is typically used.

One skilled in the art will appreciate the disclosed mechanism is capable of reliably engaging the relatively rotating members at relatively high differential rotational speeds, but such engagement may be perceived by the driver or passengers of the motor vehicle as being too harsh. Therefore, a preferred embodiment further includes some synchronization of rotational speeds prior to engagement. These methods, as described above and appreciated by one skilled in the art, include the use of engine speed control through the powertrain control module, ABS systems or traction control systems. Using these techniques, one is readily able to improve the smoothness of engagement, and therefore improve the feel of the shift to the passengers of the vehicle. Preferably the shift smoothing capabilities of an automatic transmission controller and mechanisms are also used to synchronize a device and provide smooth engagement thereof.

The forms of the invention shown and described herein constitute the preferred embodiments of the invention; they are not intended to illustrate all possible forms thereof. The words used are words of description rather than of limitation, and various changes may be made from that which is described here without departing from the spirit and scope of the invention.

What is claimed is:

1. A secondary transmission assembly housed in a case, comprising:

an input shaft rotatably supported about an axis;

a second relatively rotating shaft drivably connectable to the input shaft;

a coupling for mutually connecting and disconnecting the shafts, said coupling having a first spline tooth with a first axial length, and a second spline tooth and an end having a frusto-conical shape, and one of said shafts having a plurality of third spline teeth for engagement with the spline teeth of the coupling, said third spline teeth having a complimentary frusto-conical shape;

a selector moveable for actuating the coupling to mutually connect and disconnect the shafts; and a resilient connection provided between the coupling and selector.

2. The assembly of claim 1, wherein the second and third spline teeth comprise tapered spline teeth having flat contact surfaces and a plurality of alternating first and second spline teeth being recessed axially to promote synchronization.

3. The assembly of claim 2, wherein the coupling is moved axially by a shift fork, and the selector further comprises a spring loaded ball lock mechanism for axially engaging the fork and coupling to impede relative axial movement between the coupling and fork.

4. The assembly of claim 3, wherein the shifting mechanism further comprises a gearset connected between the shafts adapted to produce a direct drive connection between the shafts when said shafts are connected mutually and to underdrive the second shaft in relation to the input shaft when said shafts are mutually disconnected and a member of the gearset is connected with the case, the selector actuating the coupling to mutually connect and disconnect the shafts, the coupling mutually connecting the shafts to produce a direct drive ratio and mutually disconnect the shafts and connecting the member of the gearset to the case using the coupling to produce an underdrive ratio through the gearset.

5. The assembly of claim 4, wherein the coupling comprises a sleeve alternately slidably engageable with the shafts, and the gearset member and the case.

6. The assembly of claim 5, wherein the selector comprises:
   a shift fork for axially sliding the coupling;
   an actuator for moving the shift fork; and
   an axial spring provided between one of:
      the actuator and the shift fork and
      the shift fork and the coupling
   for resiliently urging the coupling axially when said shift fork is moved axially.

7. The assembly of claim 6, wherein the axial spring is compressed to provide substantially instant engagement of the coupling when the rotational speeds of the shafts are substantially synchronized.

8. The assembly of claim 7, wherein the selector further comprises a spring loaded ball lock for axially engaging the fork and coupling to impede relative axial movement between the coupling and fork.

9. The assembly of claim 8, wherein the actuator comprises a motor for axially moving the shift fork.

10. The assembly of claim 9, wherein the motor is controlled by the computer to control a rotational speed and a load output by the motor.

11. The assembly of claim 10 further comprising a computer to control the rotational speed of one of the input shaft and second shaft for synchronizing rotational speed of the shafts for mutual connection.

12. The assembly of claim 11, wherein said computer comprises one of the group comprising an antilock braking system to control the rotational speed of the second shaft, a traction control system to control the rotational speed of the second shaft, an engine controller to control the rotational speed of the input shaft and a transmission controller to control the rotational speed of the input shaft.

13. The assembly of claim 12, wherein the actuator further comprises a pivoting link provided between the motor and shift fork for actuating the shift fork.

14. The assembly of claim 13, wherein the actuator further comprises said pivoting link rotatably supported by the case and an eccentric cam provided between one of the motor and pivoting link and the pivoting link and shift fork.

15. The assembly of claim 1, further comprising a computer to control the rotational speed of one of the input shaft and second shaft for synchronizing rotational speed of the shafts for mutual connection.

16. The assembly of claim 15, wherein the computer further simultaneously controls an axial movement of the selector while substantially synchronizing the rotational speeds of the shafts.

17. A secondary transmission housed in a case, comprising:
   an input shaft rotatably supported about an axis;
   a second relatively rotating shaft drivably connectable to the first shaft;
   a coupling for mutually connecting and disconnecting the shafts, said coupling having a snap-action engagement to drivably connect the shafts;
   a selector moveable for actuating the coupling to mutually connect and disconnect the shafts; and
   a controller for controlling an engagement timing and engagement speed of the coupling when connecting the shafts.

18. A secondary transmission according to claim 17, wherein said controller synchronizes a rotational speed of the shafts during engagement of the coupling.

19. A method of shifting gears in an automatic transmission drivably connecting an engine output shaft to a drive shaft, the method comprising the steps of:
   providing a secondary transmission in series with the automatic transmission, the secondary transmission having a shifting coupling for engaging a gearing reduction across the secondary transmission; and
   controlling a rotational speed of one of the engine output shaft and the drive shaft while controlling the engagement of the coupling.

20. A method of shifting gears in an automatic transmission according to claim 19 further comprising the step of shifting the coupling to provide an underdrive ratio.

* * * * *